Figure 1:
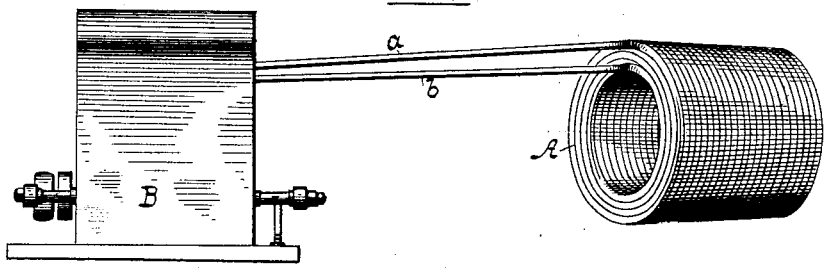

(No Model.)

A. G. CALDWELL & W. N. HILL.
APPARATUS FOR AND METHOD OF DEMAGNETIZING.

No. 245,275. Patented Aug. 9, 1881.

WITNESSES:
Philip F. Larner.
Howell Barttes

INVENTOR:
Albert G. Caldwell
Walter N. Hill
By Wm C. Noyes
Attorney

UNITED STATES PATENT OFFICE.

ALBERT G. CALDWELL, OF INDIANAPOLIS, INDIANA, AND WALTER N. HILL, OF NEWPORT, RHODE ISLAND, ASSIGNORS TO SAID HILL.

APPARATUS FOR AND METHOD OF DEMAGNETIZING.

SPECIFICATION forming part of Letters Patent No. 245,275, dated August 9, 1881.

Application filed May 5, 1881. (No model.)

*To all whom it may concern:*

Be it known that we, ALBERT G. CALDWELL, of the city of Indianapolis, in the county of Marion and State of Indiana, and WALTER N. HILL, of the city and county of Newport, and State of Rhode Island, have invented a certain novel Method of Demagnetization and Apparatus Employed for that Purpose; and we do hereby declare that the following specification, taken in connection with the drawings furnished and forming a part of the same, is a clear, true, and complete description of the several features of our invention.

Our said invention is founded upon a discovery made by us, which, stated in general terms, is that a magnetized mass may be demagnetized through an action occurring within it caused by a strong and rapidly-alternating electric current, certain conditions hereinafter set forth being duly observed. The principal condition is that the mass to be demagnetized should be located centrally within a receptacle having walls composed of suitably insulated or wound wires in direct connection with the source of the electrical currents employed. For the purposes of this specification we will term said receptacle a "demagnetizing-chamber."

The applications of our discovery to useful purposes are many and varied; but for the illustration of its practical value we deem it ample, in affording a full disclosure of our invention, to describe the same as applied by us in the rapid and complete demagnetization of watches and other small articles liable to be injuriously or objectionably affected by magnetization.

We are well aware that it has long been known that variable and alternating currents of electricity will weaken permanent magnets when the latter are employed as elements or parts of electro-magnets; but we have no reason to believe (judging from our widely-conducted experiments and varied experience) that such magnets have thereby ever been totally demagnetized.

We are also well aware that the demagnetization of parts of watches and other small articles has heretofore been attempted, and perhaps accomplished, by exposing the same to the influence of permanent magnets, while the latter, or the watch, or both, have been moved in various ways while occupying contiguous relations; but that operation at its best is slow, tedious, and uncertain in its results, and, so far as our knowledge extends, can seldom, if at all, be relied upon for total or absolute demagnetization.

The currents employed by us are preferably such as are derived through the operation of dynamo-electric machines capable of yielding alternating currents, as a type of which we will mention the well-known "Wilde" machine as one well suited for our purposes. Battery-currents may, however, be relied upon, if of sufficient strength or power, and there be employed therewith suitable mechanism for rapidly alternating the currents in a manner substantially similar to the alternations obtained in the operation of dynamo-machines of the class referred to.

Outside of the means indicated for the generation and reversal of electric currents, the apparatus requisite for working in accordance with our invention may be largely varied in form and construction. Said apparatus is merely a receiving-chamber, within which the subject to be operated upon is centrally located. The form and dimensions of said demagnetizing-chamber will, of course, in each instance, be such as are obviously best suited for the proper and convenient reception of the particular class of subjects to be demagnetized, and in all cases said chamber should be considerably longer than the article to be demagnetized. The walls of this chamber are composed of suitably-insulated wire, (as for electro-magnets,) which is so connected with the electric source as to receive the alternating currents. As an illustration of such a chamber in its simplest form, we will describe the chamber shown at A in Fig. 1 of the drawings herewith, that being one of the forms used by us in the successful demagnetization of watches. This chamber is composed of about two hundred and eighty feet of No. 5 copper wire, cotton-wound, and coiled after the manner of a helix for an electro-magnet. The length of the coil is about seven inches, and its interior diameter is about three inches. The two ends of wire, $a$ and $b$, are connected by suitable connecting-wires with the magneto-machine B, or with batteries, as the case may be. Two or more such chambers may be connected with the same dynamo machine or battery and provided with suitable switches, whereby either chamber may be wholly disconnected and the current diverted to either of the others.

Figure 2:
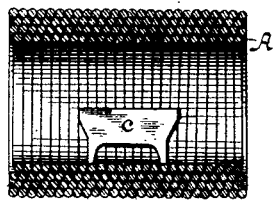

Centrally in chamber A (shown in section in Fig. 2) we prefer to provide a stand or table, c, composed of light hard rubber, wood, brass, or other non-magnetic material, for supporting the watch during the operation. We prefer that the walls of the chamber be absolutely free from electrical influences while removing the watch or other article from the chamber. While the watch is thus located the active current is applied through the coil for such time as may be requisite in each case.

In our experience from one to three minutes of exposure in a coil-chamber of the character described in detail has been amply sufficient to demagnetize watches which were rendered inoperative by the magnetization of their steel parts. The machine, when employed by us for this purpose, was driven at such speed as afforded about seven thousand two hundred (7,200) alternations per minute, and, so far as our experience thus far indicates, the object sought is obtained with a rapidity substantially proportioned to the speed of the machine.

While we prefer the cylindrical-coil form with the wire arranged as in a helix, we are aware that various other forms may be employed with the wire in a great variety of arrangement, as will be obvious to persons skilled in electrical matters on receiving this disclosure of our discovery, which we deem ample for attaining those ends which specifications of Letters Patent are designed to accomplish.

We will state, however, that we propose to employ demagnetizing-chambers constructed in sections, so that without breaking continuity of the helix said chambers may be opened centrally for the more convenient reception of articles to be operated upon and their removal therefrom.

While we might herein present our understanding of the theory and principles involved in our novel method of demagnetizing metals, and while we would therein differ from some of the well-known theories pertaining to the general subjects of electricity and magnetism, we do not deem such views of value for the purposes of this specification, inasmuch as we have herein disclosed the fact of our discovery and have set forth in detail a practical application thereof to a useful purpose.

Having thus described our invention and discovery, we claim as new and desire to secure by Letters Patent—

1. The method of demagnetizing metals, substantially as hereinbefore described, by subjecting them to the influences of rapidly-alternating electric currents.

2. The combination, substantially as hereinbefore described, of apparatus for generating electric currents and rapidly alternating the same and a demagnetizing-chamber.

3. A demagnetizing-chamber having walls composed of insulated wire, in combination with a supporting table or stand located centrally therein, substantially as described.

ALBERT G. CALDWELL.
WALTER N. HILL.

Witnesses:
HARWOOD E. READ,
DARIUS BAKER.